(12) United States Patent
Stafford

(10) Patent No.: US 11,301,047 B2
(45) Date of Patent: Apr. 12, 2022

(54) HYBRID WIRELESS STREAMING SOLUTION, SWITCHING FROM 2D TO 3D BASED ON AN INTUITIVE HAND GESTURE IN VIRTUAL REALITY OR AUGMENTED REALITY (AR) HEAD-MOUNTED DISPLAYS (HMD)

(71) Applicant: Sony Interactive Entertainment Inc., Tokyo (JP)

(72) Inventor: Jeffrey R. Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/857,761

(22) Filed: Apr. 24, 2020

(65) Prior Publication Data

US 2021/0333883 A1 Oct. 28, 2021

(51) Int. Cl.
*G06F 3/01* (2006.01)
*G02B 27/00* (2006.01)
*H04N 21/47* (2011.01)

(52) U.S. Cl.
CPC .......... *G06F 3/017* (2013.01); *G02B 27/0093* (2013.01); *G06F 3/013* (2013.01); *H04N 21/47* (2013.01)

(58) Field of Classification Search
CPC .............................. G06F 3/017; G02B 27/0093
See application file for complete search history.

(56) References Cited

U.S. PATENT DOCUMENTS

| | | |
|---|---|---|
| 2019/0220088 A1* | 7/2019 | Ishii ................... G06F 3/04847 |
| 2020/0050256 A1* | 2/2020 | Yamamoto ............. G06F 3/017 |
| 2020/0209953 A1* | 7/2020 | Parsley .................. G06F 3/017 |

OTHER PUBLICATIONS

"Search Report and Written Opinion" dated May 12, 2021 from the counterpart PCT application PCT/US21/027790.

* cited by examiner

*Primary Examiner* — Chun-Nan Lin
(74) *Attorney, Agent, or Firm* — John L. Rogitz

(57) ABSTRACT

A computer game can be viewed on a TV through an augmented reality (AR) head-mounted display (HMD). The wearer can make a gesture such as a first to cause the HMD to present 2D rectangles and 3D objects representing locations in the room that the game can be "presented" in. The wearer may then open his hand and "cast" toward one of the room locations, and the game is transferred to the HMD for presentation in the associated rectangle (in 2D) or 3D object (in 3D).

16 Claims, 7 Drawing Sheets

EXAMPLE GESTURE TO SWITCH FROM DISPLAY MODE TO VR MODE

HYBRID WIRELESS STREAMING SOLUTION, SWITCHING FROM 2D TO 3D BASED ON AN INTUITIVE HAND GESTURE IN VIRTUAL REALITY OR AUGMENTED REALITY (AR) HEAD-MOUNTED DISPLAYS (HMD)

FIELD

The application relates generally to hybrid wireless streaming solutions for switching from 2D to 3D based on an intuitive hand gesture in AR HMD.

BACKGROUND

Computer simulations such as computer games frequently employ head-mounted displays (HMD) for purposes of presenting virtual reality (VR) and augmented reality (AR) experiences. As understood herein, as computer games grow more sophisticated, greater interactivity in the real world in which an AR or VR game is being played may be desirable.

SUMMARY

Accordingly, an assembly includes at least one processor configured with instructions executable to present a computer simulation on at least a first display. The instructions also are executable to receive user-generated input, and responsive to the user-generated input, switch presenting the computer simulation to a head-mounted display (HMD) different from the first display.

The computer simulation may include a computer game and the first display can include a TV.

In some examples, the input may include at least one image of at least one gesture in free space.

In non-limiting examples, the instructions may be executable to present on the HMD at least one graphic corresponding to a location in a space at which the computer simulation can be emulated to be presented. In such examples the instructions can be executable to present on the HMD the graphic responsive to first input. In example implementations the graphic includes a three dimensional (3D) object and the instructions are executable to, responsive to the user-generated input being associated with the 3D object, switch a presentation mode from an image-based mode to an object-based mode, and stream objects in the object-based mode to the HMD for presentation of the objects on the HMD in in a portion of the HMD indicated by the 3D object. If desired, the instructions can be executable to pause the computer simulation between receiving the user-generated input and commencing streaming the objects to the HMD.

In other example embodiments the graphic may include a two dimensional (2D) object and the instructions may be executable to compress information in an image-based mode, and stream the information to the HMD for presentation of the information on the HMD in in a portion of the HMD indicated by the 2D object. In such embodiments the instructions can be executable to pause the computer simulation between receiving the input and commencing streaming the information to the HMD.

Objects may be streamed in the object-based mode to the HMD based at least in part on a direction of gaze such that only objects corresponding to the direction of gaze are streamed.

The processor may be implemented by a dongle for legacy device applications.

In another aspect, an assembly includes at least one video display, at least one head-mounted display (HMD), and at least one processor configured with instructions for presenting a computer simulation on the video display. The instructions also are executable for, responsive to at least one hand gesture in free space, shifting presentation of the computer simulation from the video display to the HMD.

In another aspect, a method includes presenting a video simulation on a video display, identifying at least a first gesture, and responsive to the first gesture, presenting the video simulation on at least one head-mounted display (HMD).

The details of the present application, both as to its structure and operation, can best be understood in reference to the accompanying drawings, in which like reference numerals refer to like parts, and in which:

DETAILED DESCRIPTION

Figure 1:
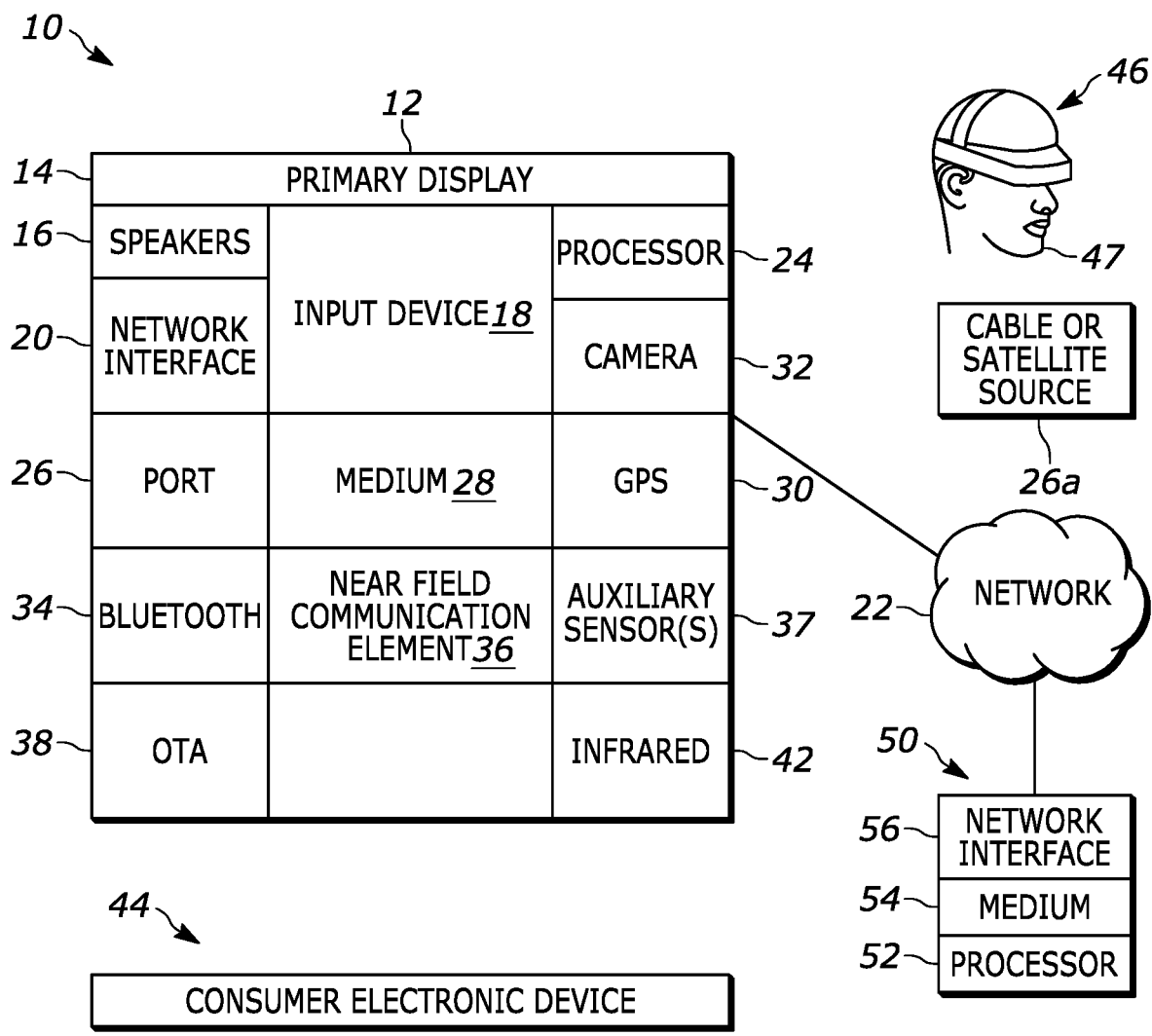
FIG. 1 is a block diagram of an example system including an example in accordance with present principles.

This disclosure relates generally to computer ecosystems including aspects of consumer electronics (CE) device networks such as but not limited to computer game networks. A system herein may include server and client components including HMDs which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc. or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be any conventional general-purpose single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or an HMD worn by a player 47. In the example shown, only two CE devices 44, 46 are shown, it being understood that fewer or greater devices may be used. A CE device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Figure 2:
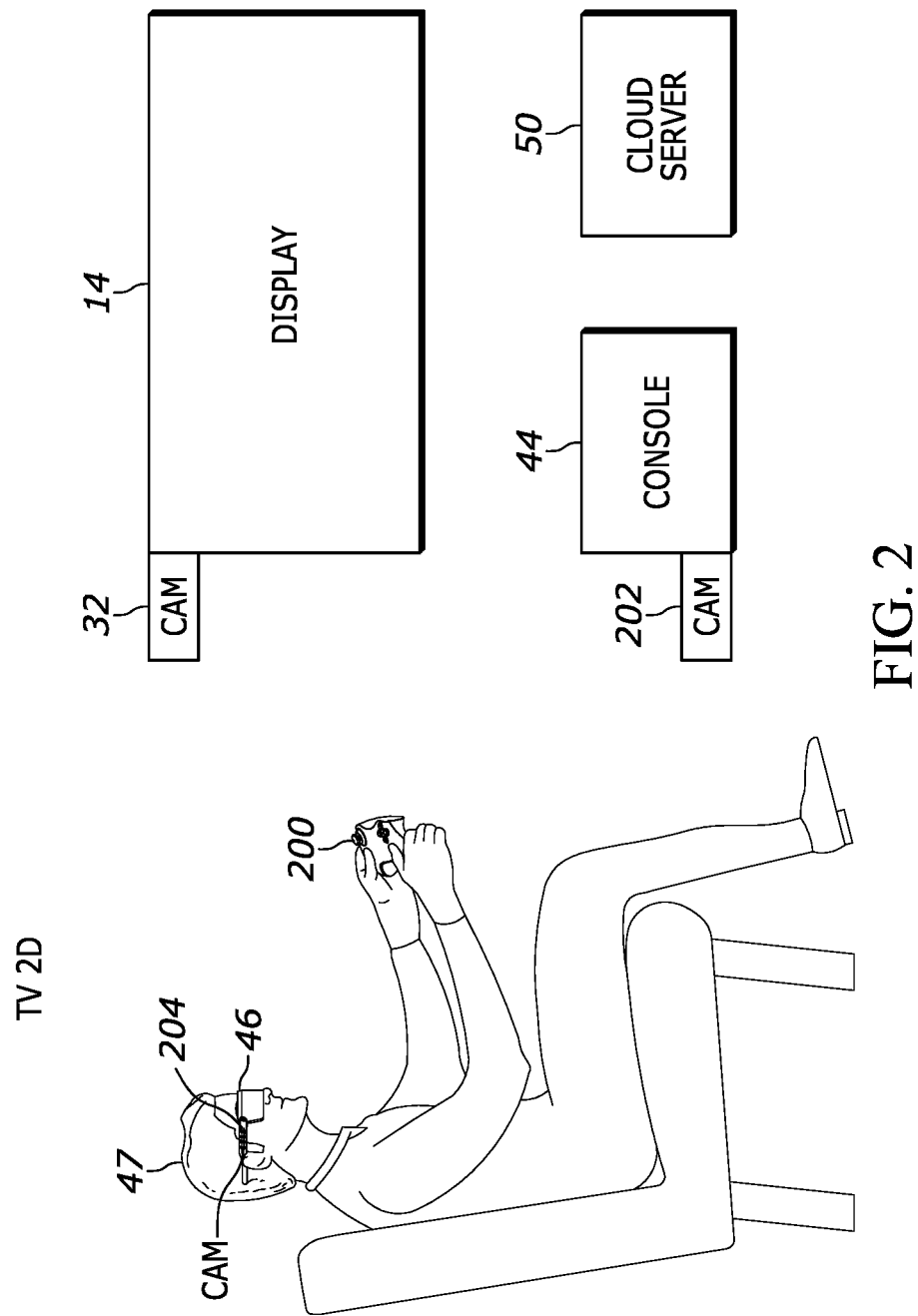
FIG. 2 is an illustration of a player wearing a head-mounted display (HMD) and operating a video game controller to play a video game being presented on a real-world display such as a TV.

FIG. 2 illustrates an example in which the user 47 in FIG. 1 is shown wearing the HMD 46 while playing a computer simulation such as a computer game displayed on the display 14. The simulation may be sourced from a game console 44 and/or cloud server 50 and may be controlled by manipulation of a computer game controller 200. One or more cameras 202 may be implemented by the display 14 and/or console 44 and/or other device to image the user 47. The HMD 46 may include one or more sensors 204 such as cameras to image both the external space and the eyes of the user 47.

Figure 3:
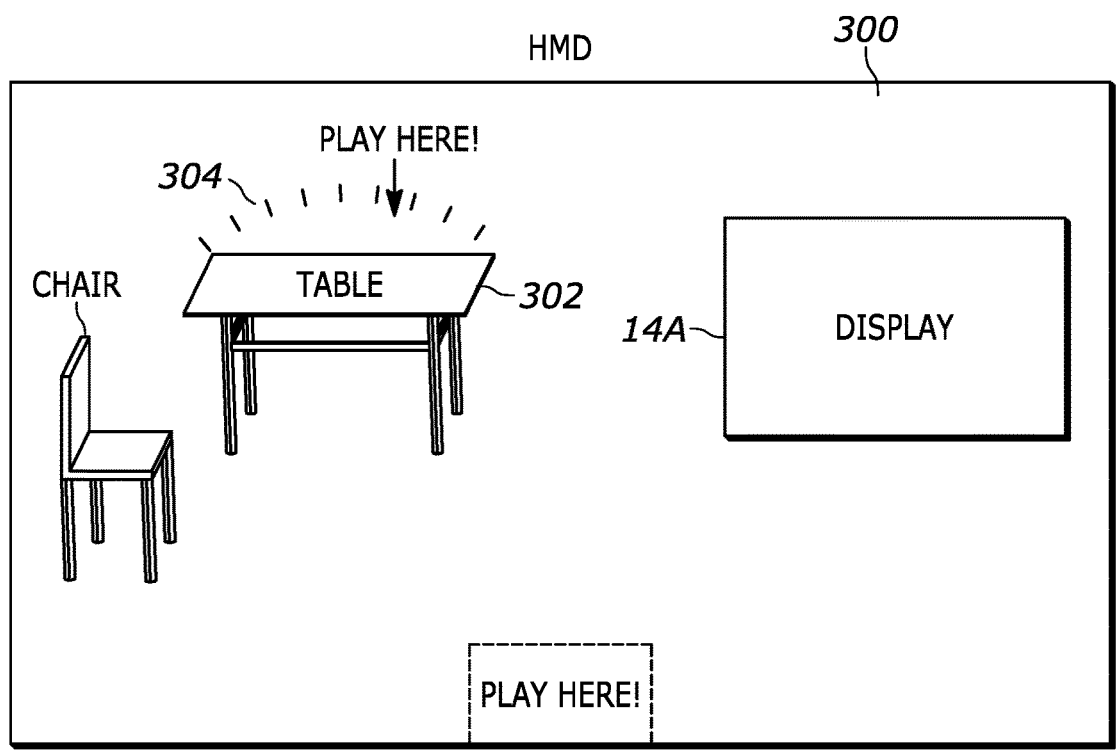
FIGS. 3 and 4 illustrate example images that may be presented on the HMD of FIG. 2 to inform the player of available locations in the room to which presentation of the video game on the TV may be transferred.

With the above in mind, reference is now made to FIG. 3, in which an HMD display portion 300 enables the user 47 to see through the display region 300 the display 14, labeled 14A in FIG. 3. Assume that the user is a playing a game via the console 44 connected to the display 14 while wearing an AR HMD device. The AR HMD device is thus providing a view of the real world, showing at 14A the image of the real display 14 presenting a game being played. The user can look around the real room and the AR HMD presents suitable flat surfaces such as a table 302 and/or plain areas where an AR version of the game being played can be virtually presented. These areas may be highlighted as indicated at 304 by augmented virtual graphics applied to the real-world view in the HMD.

Figure 4:
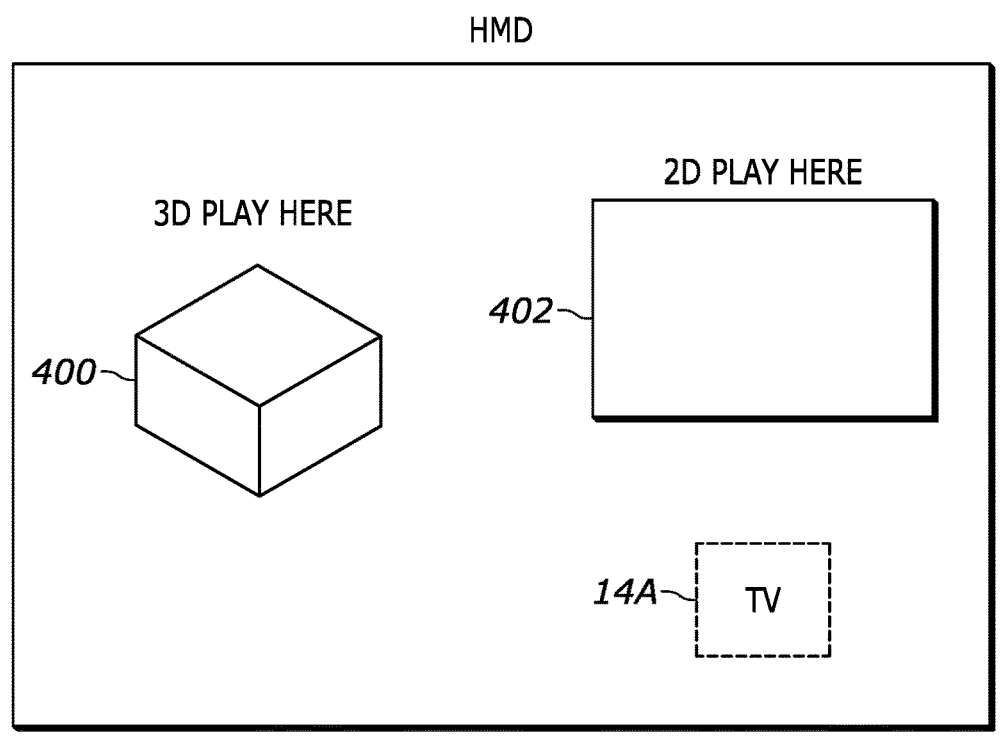

FIG. 4 illustrates that two different types of highlighted areas may appear based on the flat/plain areas in view. For horizontal flat/plain areas like coffee tables, above tables, floor space, on top of couch, etc. a 3D rectangular volume 400 highlight can appear on the HMD indicating that a 3D volume within the real room exists that can accommodate a 3D AR version of the game being played on the display 14. If the flat/plain area is vertical like a wall, door or side of cabinet, back of couch, etc. (excepting the active display 14 showing the game being played), a 2D vertically orientated rectangle highlight 402 may appear to highlight a 2D vertically oriented space suitable for a virtual 2D image to mirror the image of the game being shown on the display 14. Both the virtual 3D area 400 and 2D area 402 can be any size, larger or smaller than the original TV view.

Figure 5:
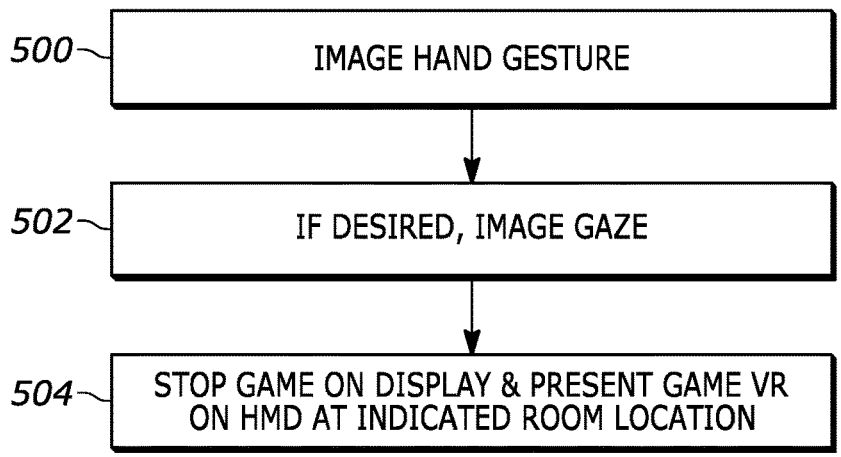
FIG. 5 is a flow chart of example logic attendant to FIGS. 3 and 4.

FIG. 5 illustrates overall logic. With the game running normally on the console 44 and/or server 50 and being presented on the display 14, data including augmented reality (AR) graphics may be wirelessly streamed to the HMD 46. The data may include the 2D image (game framebuffer) output by the simulation and metadata (such as title identification of the simulation) to the HMD. The 2D image of the game can be used by the HMD to locate the position of the display 14 in space as sensed by the sensors 204 in FIG. 2, which may include IR or RGB cameras. The game metadata can be used to assist with launching the appropriate HMD version of game title being played on the console device.

At block 500, user input is received. In an example, the input includes a gesture in free space, such as a hand gesture, that is imaged and, using image recognition, recognized. If the gesture is recognized as a "switch" gesture, it is interpreted to be a command to switch from a 2D presentation mode on the display 14 to another AR mode. If desired, the user's gaze may be imaged by the HMD sensors and indication thereof sent to the console or server as appropriate at block 502.

Moving to block 504, in response to the gesture the simulation is stopped (paused) on the display 14 and then the game streamed to the HMD for presentation at a virtual location indicated in FIG. 3 or 4. Only the video of the simulation may be paused and audio may continue to be played. Further details of ensuing processing are disclosed below.

Figure 6:
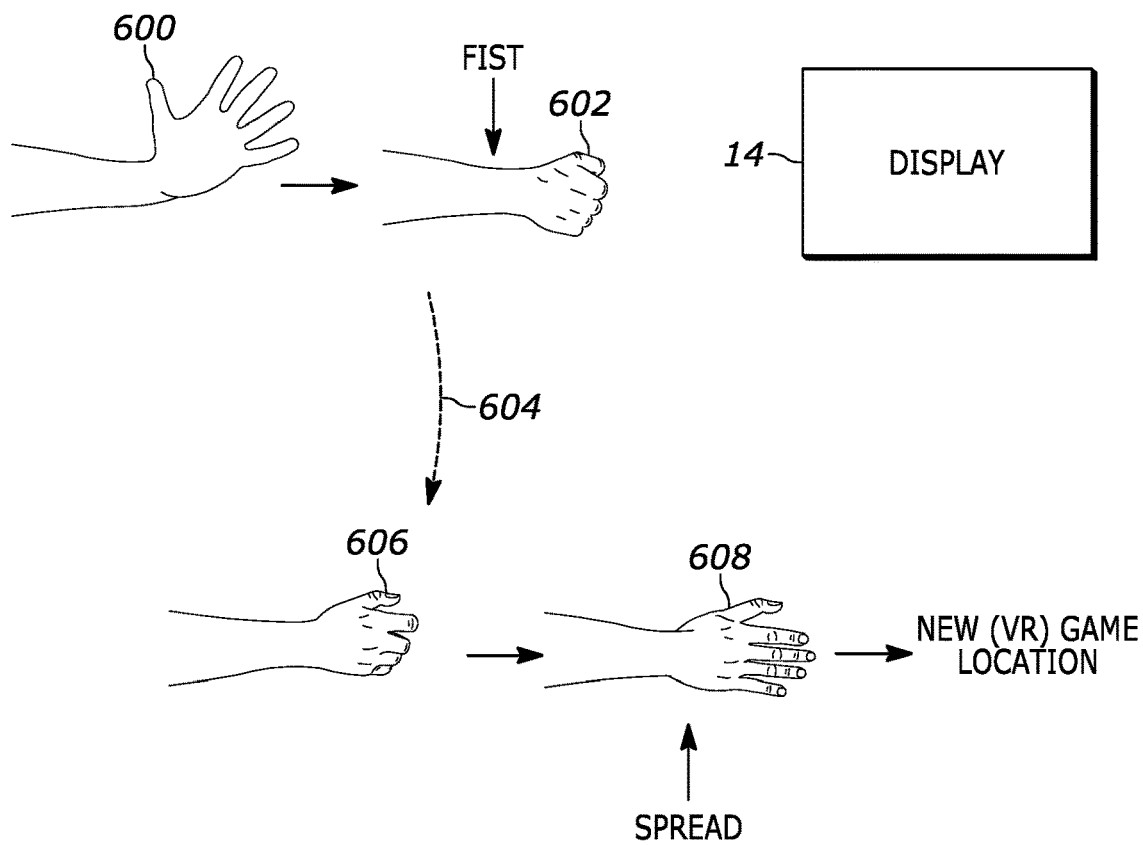
FIG. 6 illustrates a series of example gestures in free space that the player may make to transfer presentation of the game from the TV to emulated locations in the room.

FIG. 6 illustrates an example "switch" gesture. An example hand gesture involves the user reaching out to the direction of the display 14 with fingers spread as indicated at 600, then making a grabbing gesture as indicated at 602 such as one would make grabbing a foam ball and scrunching the foam ball forming a fist. The user then moves his hand, as indicated by the arrow 604, to align with one of the AR highlighted regions shown in FIG. 3 or 4, as indicated at 606. The last phase of the gesture is indicated at 608, showing the user unfurling his hand from a first into spread fingers again. This gesture signifies a mode switch, to move the game content from displaying on the real display 14 to the AR space in the highlighted region.

Alternatively, a combination of the user's gaze in combination with unaligned hand gesture towards the highlighted region or user's gaze and pressing a button on a controller can initiate the mode change.

Figure 7:
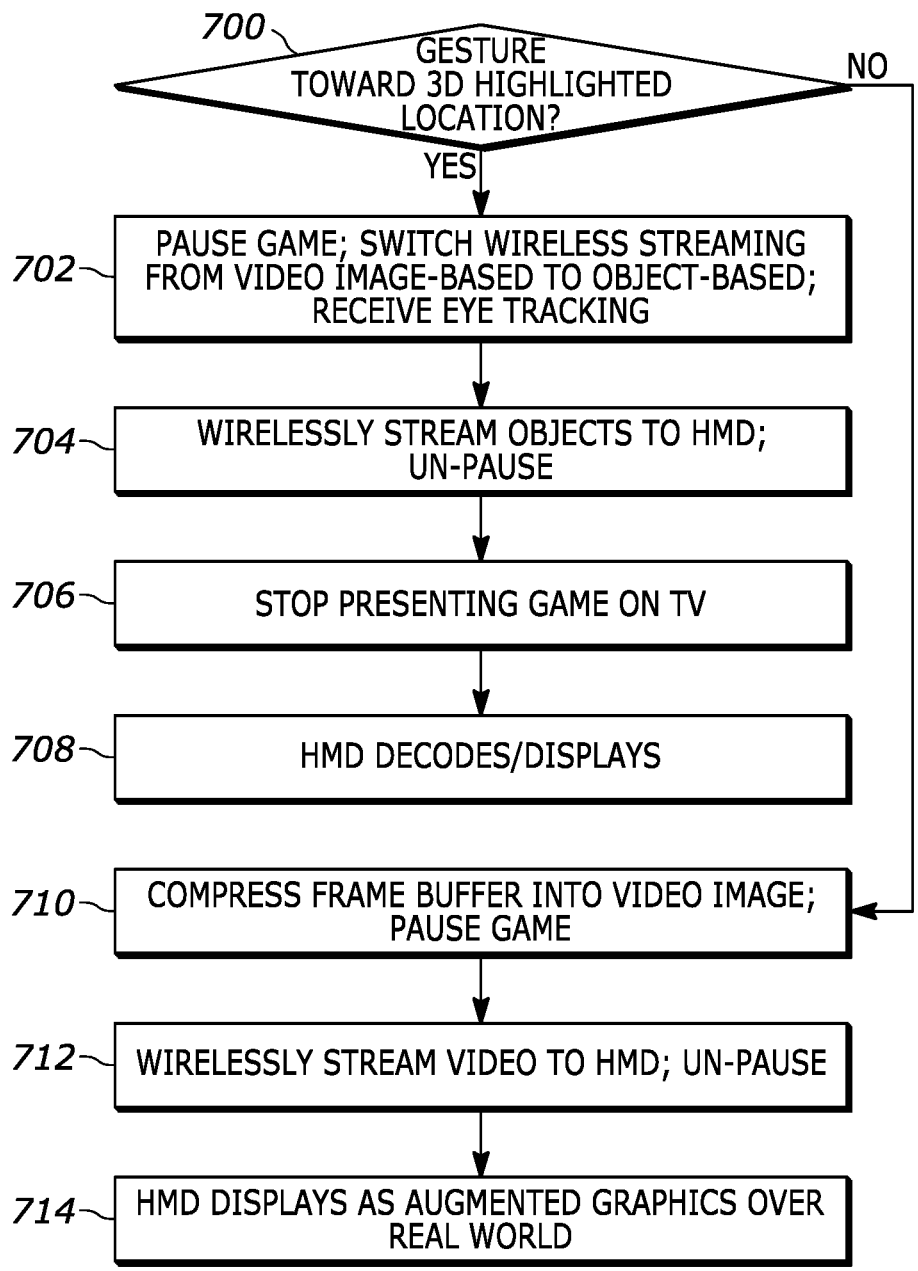
FIG. 7 is a flow chart of example logic attendant to FIG. 6.

When the gesture is recognized, the game playing on the console transitions from real display 14 presentation to either AR 3D or AR 2D depending on the type of AR highlighted region the user has gestured toward. FIG. 7 illustrates further.

Decision diamond 700 indicates that when the user has gestured toward a 3D virtual region being presented on the HMD, the logic moves to block 702 to pause the simulation. Wireless streaming is switched from video image based (TV 2D mode and/or AR 2D modes) to object-based streaming. Eye tracking information also may be received for purposes to be shortly disclosed.

In this streaming mode, the game's object data (vertices, polygons, textures, etc.) is wirelessly streamed at block 704 to the AR HMD instead of a compressed video image of the game output image. If desired, presentation of the simulation on the display 14 may cease at block 706. At block 708 the AR HMD decodes the object data, which may or may not include pre-rendered data (such as pre-shaded textures) from the console (or server) and then render the game view as augmented 3D virtual graphics over the real view. The user can now freely move his head and body around the 3D rectangular region containing the 3D version of the game and see it from different angles.

During this mode, the game need no longer be displayed on the display 14 and the display 14 image may simply show a different graphic image to represent a target for reentering the TV 2D mode. For example, the display 14 may simply display a 2D rectangle as a highlight.

The same gesture mechanism shown in FIG. 6 can be used to grab, place and unfurl the AR 3D view of the game (AR 3D mode) to either a AR highlighted 2D region in the room or back to the real display 14 (which is showing a 2D rectangular as a highlight region similar to AR 2D regions).

On the other hand, if the user has gestured toward an AR 2D region at decision diamond 700, the logic can move to block 710 to implement video image based streaming, in which the simulation output (such as the framebuffer) of the simulation is compressed into a video image and sent wirelessly to the AR HMD at block 712. At block 714 the AR HMD displays the 2D rectangular image of the game output as augmented graphics over the real view in the highlighted region.

The gesture of FIG. 6 may be made once again to grab the AR 2D image game shown as augmented virtual graphics and switch the mode back to the TV 2D, where the game's 2D output image is no longer shown as augmented graphics in the AR HMD, but as a real 2D image on the real display 14 in the room.

The above system allows for seamless transition of games that simultaneously supports TV and AR gameplay and provides an intuitive mechanism for users to switch between the two play modes at their convenience. The user may wish to do this if the rest of the family wants to utilize the TV for other content.

Indeed, using principles above the AR HMD user can grab the TV game image into his fist, walk into another room, and place the game as a virtual TV on a bedroom wall to continue playing the game in another room.

During the transition from game modes (TV 2D, AR 2D and AR 3D) the game system may signal the game to pause the running content such that gameplay is unaffected by the mode switch. Therefore, the system sends an un-pause to the game once the game view has switched into its target mode.

Note further that eye tracking may be used to conserve bandwidth. Specifically, when streamlining the simulation to the HMD, only objects in the direction of gaze of the user need be streamed to the virtual location the user is looking at, and other objects in the game need not be streamed.

Figure 8:
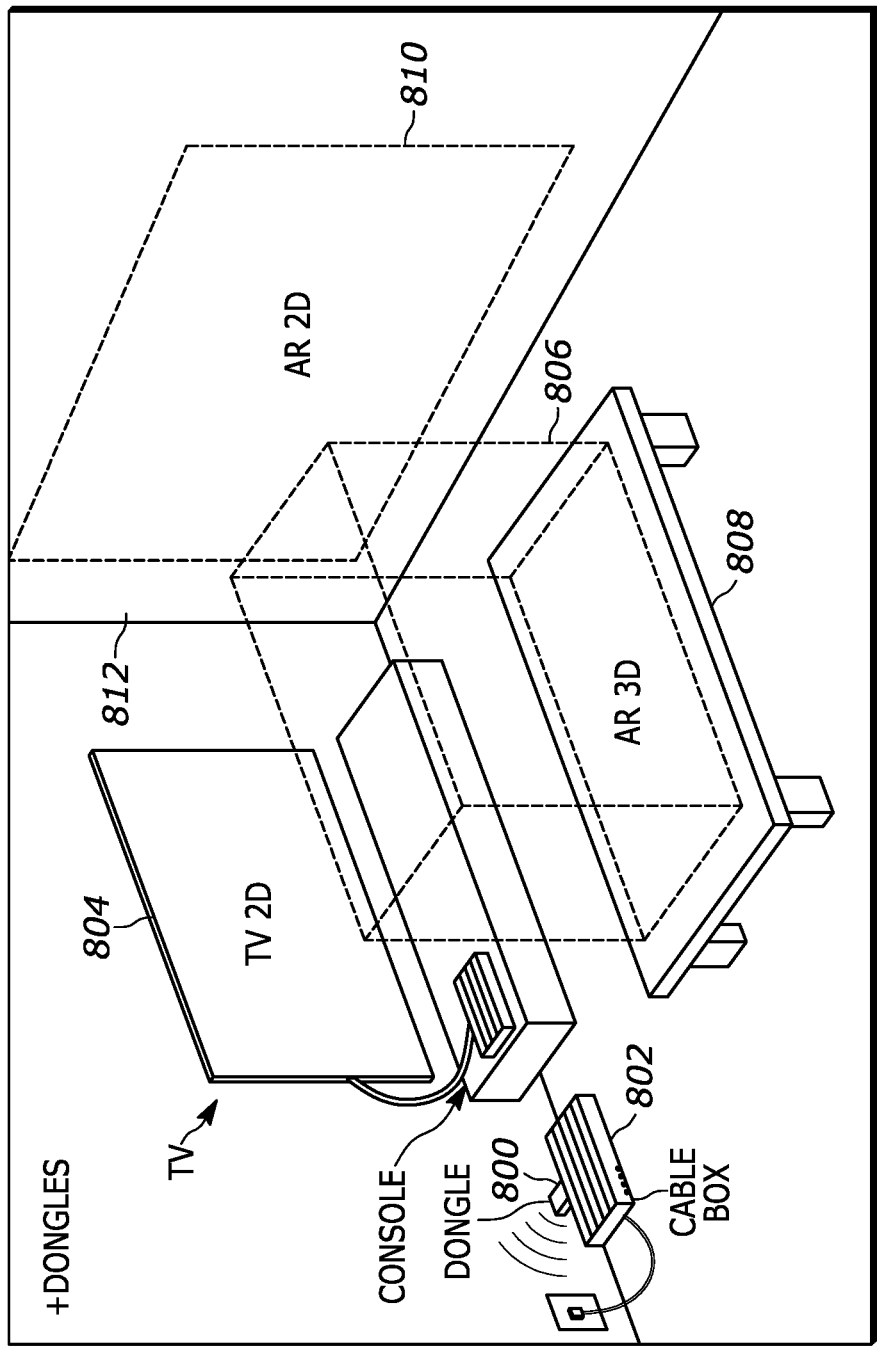
FIG. 8 illustrates a legacy TV embodiment using a HDMI dongle.
Figure 9:
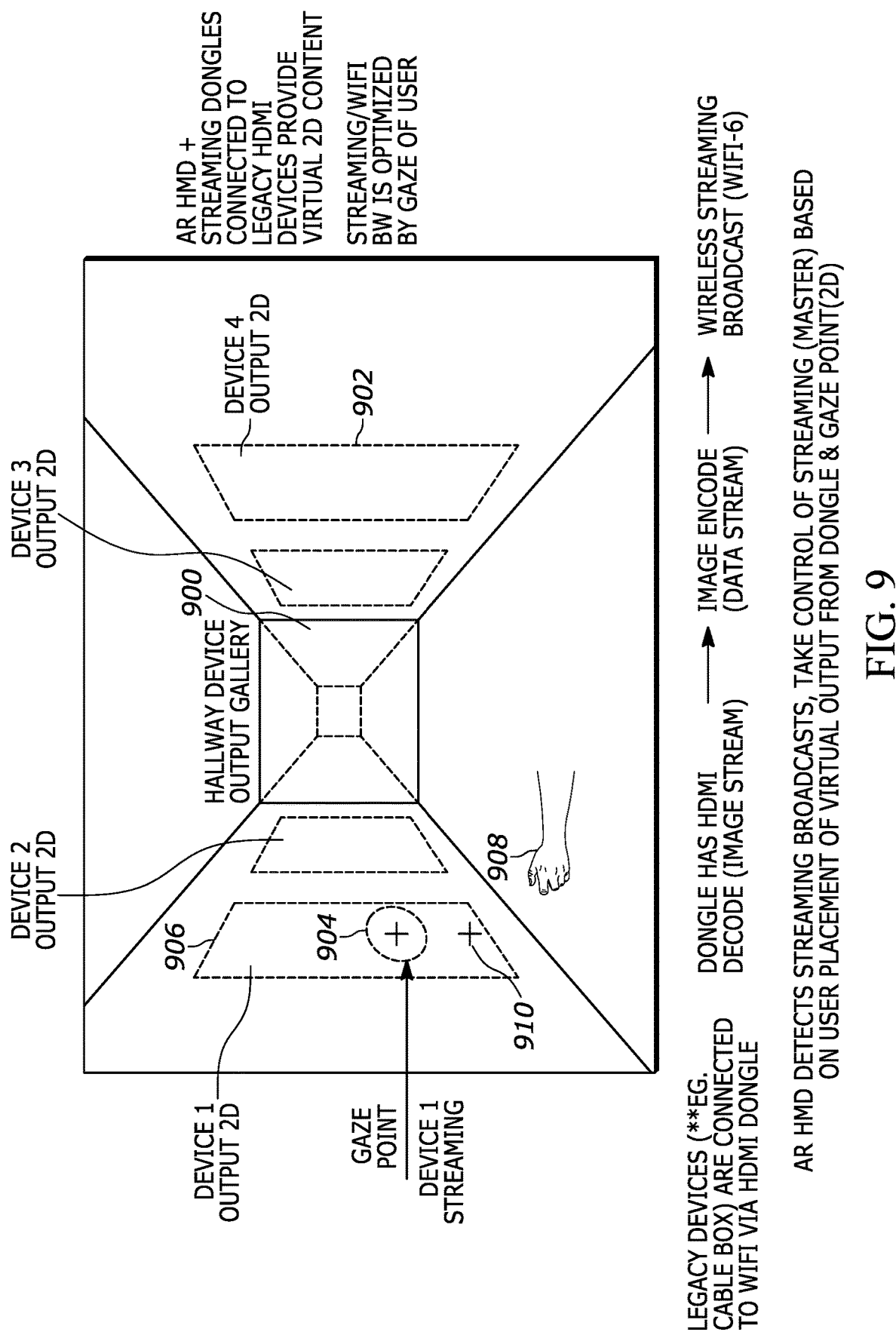
FIG. 9 illustrates an AR graphics display consistent with present principles.

It is to be understood that the logical operations herein may be performed by any device or combination of devices described herein, including the embodiment that is the subject of FIGS. 8 and 9, in which a dongle 800 such as a high definition multimedia interface (HDMI) dongle is communicatively engaged with a legacy cable or satellite set top box 802 that may output computer simulations to a legacy TV 804 via, e.g., one or more HDMI links. The dongle 800 contains circuitry to decode HDMI content from the STB 802, encode images therefrom, and then wirelessly stream the encoded images to the HMD.

As shown in FIG. 8, the dongle executing present logic wirelessly streams, on the HMD 46, indications shown in dashed lines in FIG. 8 of virtual areas corresponding to real regions in the room at which the user can shift presentation of a computer simulation according to principles described herein. Specifically, in FIG. 8 a 3D box 806 is shown superimposed on a real table 808 to indicate that the simulation may be shifted from the TV 804 to be streamed from the dongle to the HMD to be virtually presented in 3D in the box 806 by the HMD. Also, a 2D plane 810 is shown superimposed on a real wall 812 to indicate that the simulation may be shifted from the TV 804 to be streamed from the dongle to the HMD to be virtually presented in 2D in the plane 810 by the HMD.

FIG. 9 illustrates that the user from FIG. 8 may move to a hallway 900 or other room location and the dongle 800 may stream to the HMD indications 902 of content detected by the dongle to be available in the set top box. In the example shown, the indications 902 are rectangles presented on the HMD over real walls with each indication being, for example, a thumbnail or video representing a respective piece of content available from the STB.

FIG. 9 also indicates the user's gaze point 904 as detected by eye tracking using a camera on the HMD. Only the indication 906 in which the gaze point is located need be streamed to the HMD, with the other indications 902 not being streamed unless and until the user's gaze falls within their respective areas. This saves streaming bandwidth. As indicated by the image 908 of the user's hand, when the user's hand nears an indication 902/906, a visible indicator 910 such as a flash may be presented in the indication by the HMD to indicate to the user which indication he is approaching.

It will be appreciated that whilst present principals have been described with reference to some example embodiments, these are not intended to be limiting, and that various alternative arrangements may be used to implement the subject matter claimed herein.

What is claimed is:

1. An assembly, comprising:
at least one processor configured with instructions executable to:
present a computer simulation on at least a first display;
receive user-generated input;
responsive to the user-generated input, switch presenting the computer simulation to a head-mounted display (HMD) different from the first display; and
present on the HMD at least one graphic corresponding to a location in a space at which the computer simulation can be emulated to be presented.

2. The assembly of claim 1, wherein the computer simulation comprises a computer game and the first display comprises a TV.

3. The assembly of claim 1, wherein the input comprises at least one image of at least one gesture in free space.

4. The assembly of claim 1, wherein the instructions are executable to present on the HMD the graphic responsive to first input.

5. The assembly of claim 4, wherein the graphic comprises a three-dimensional (3D) object and the instructions are executable to:

responsive to the user-generated input being associated with the 3D object, switch a presentation mode from an image-based mode to an object-based mode; and stream objects in the object-based mode to the HMD for presentation of the objects on the HMD in in a portion of the HMD indicated by the 3D object.

6. The assembly of claim 5, wherein the instructions are executable to:

pause video of the computer simulation between receiving the user-generated input and commencing streaming the objects to the HMD while continuing to play audio of the computer simulation.

7. The assembly of claim 5, wherein the instructions are executable to:

stream objects in the object-based mode to the HMD based at least in part on a direction of gaze such that only objects corresponding to the direction of gaze are streamed.

8. The assembly of claim 1, wherein the graphic comprises a two-dimensional (2D) object and the instructions are executable to:

compress information in an image-based mode; and
stream the information to the HMD for presentation of the information on the HMD in a portion of the HMD indicated by the 2D object.

9. An assembly, comprising:

at least one processor configured with instructions executable to:

present a computer simulation on at least a first display;
receive user-generated input; and
responsive to the user-generated input, switch presenting the computer simulation to a head-mounted display (HMD) different from the first display, wherein the processor is implemented by a dongle.

10. An assembly comprising:

at least one video display;
at least one head-mounted display (HMD); and
at least one processor configured with instructions for:
presenting a computer simulation on the video display; and
responsive to at least one hand gesture in free space, shifting presentation of the computer simulation from the video display to the HMD, wherein the hand gesture comprises a first hand gesture and the instructions are executable for:

responsive to a second hand gesture, present on the HMD visual indication of a location in a space to which presentation of the computer simulation may be emulated to be shifted.

11. The assembly of claim 10, wherein the secondhand gesture is received prior to the firsthand gesture, and the instructions are executable for:

shifting presentation of the computer simulation from the video display to the HMD responsive to the firsthand gesture indicating the location in the space.

12. The assembly of claim 10, wherein the computer simulation comprises a computer game and the video display comprises a TV.

13. The assembly of claim 10, wherein the visual indication comprises a three-dimensional (3D) object and the instructions are executable for:

responsive to the firsthand gesture being associated with the location in the space, switching a presentation mode from an image-based mode to an object-based mode; and streaming objects in the object-based mode to the HMD for presentation of the objects on the HMD in in a portion of the HMD indicated by the 3D object.

14. The assembly of claim 13, wherein the instructions are executable for:

pausing the computer simulation between imaging the first hand gesture and commencing streaming the objects to the HMD.

15. The assembly of claim 10, wherein the visual indication comprises a two-dimensional (2D) object and the instructions are executable for:

compressing information in an image-based mode based at least on part on a direction of gaze; and
streaming the information to the HMD for presentation of the information on the HMD in a portion of the HMD indicated by the 2D object.

16. An assembly comprising:

at least one video display;
at least one head-mounted display (HMD); and
at least one processor configured with instructions for:
presenting a computer simulation on the video display; and
responsive to at least one hand gesture in free space, shifting presentation of the computer simulation from the video display to the HMD, wherein the processor is implemented by a dongle.

* * * * *